United States Patent
Byun et al.

(10) Patent No.: US 11,832,277 B2
(45) Date of Patent: Nov. 28, 2023

(54) METHOD AND APPARATUS FOR PAGING FOR MULTICAST AND BROADCAST SERVICE IN A WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 17/305,360

(22) Filed: Jul. 6, 2021

(65) Prior Publication Data
US 2022/0015063 A1  Jan. 13, 2022

(30) Foreign Application Priority Data
Jul. 7, 2020 (KR) .......................... 10-2020-0083600

(51) Int. Cl.
*H04W 72/30* (2023.01)
(52) U.S. Cl.
CPC ................... *H04W 72/30* (2023.01)
(58) Field of Classification Search
CPC ... H04W 72/005; H04W 72/30; H04W 76/11; H04W 76/40; H04L 5/14
See application file for complete search history.

(56) References Cited

U.S. PATENT DOCUMENTS

| | | | | |
|---|---|---|---|---|
| 7,006,528 B1 * | 2/2006 | Kokkinen | ............ | H04N 21/643 370/467 |
| 10,601,627 B2 * | 3/2020 | Yi | .......................... | H04W 24/10 |
| 2014/0334360 A1 * | 11/2014 | Rubin | ..................... | H04L 67/56 370/280 |
| 2014/0373124 A1 * | 12/2014 | Rubin | ................... | H04W 12/08 726/7 |
| 2017/0238280 A1 * | 8/2017 | Kim | ...................... | H04W 76/40 370/329 |

(Continued)

OTHER PUBLICATIONS

3rd Generation Partnership Project, "Technical Specification Group Radio Access Network; NG-RAN; F1 application protocol (F1AP) (Release 16)," Section 8.71 of 3GPP TS 38.473 V16.1.0, Mar. 2020, 240 pages.

*Primary Examiner* — Hassan A Phillips
*Assistant Examiner* — Prenell P Jones
(74) *Attorney, Agent, or Firm* — LEE HONG DEGERMAN KANG WAIMEY

(57) ABSTRACT

A method and apparatus for paging for multicast and broadcast service in a wireless communication system is provided. A Distributed Unit (DU) of a Radio Access Network (RAN) node may receive, from a central unit (CU) of the RAN node, a service identity for a Multicast and/or Broadcast (MB) service. A MB session may be set for the MB service. A DU of a RAN node may transmit, to multiple User Equipments (UEs) in Connection Management (CM)-IDLE state, the service identity of the MB service. The multiple UEs may have joined to the MB session. A DU of a RAN node may receive, from at least one UE among the multiple UEs, an RRC message to request the MB service. A DU of a RAN node may forward the RRC message to the CU of the RAN node.

2 Claims, 12 Drawing Sheets

(56) References Cited

U.S. PATENT DOCUMENTS

| | | | |
|---|---|---|---|
| 2018/0103427 A1* | 4/2018 | Griot | H04W 76/40 |
| 2019/0014208 A1* | 1/2019 | Fiorini | H04M 1/663 |
| 2019/0075023 A1* | 3/2019 | Sirotkin | H04W 88/08 |
| 2019/0132790 A1* | 5/2019 | Lee | H04W 48/18 |
| 2020/0045753 A1* | 2/2020 | Dao | H04W 76/10 |
| 2020/0137685 A1* | 4/2020 | Kim | H04W 52/0245 |
| 2020/0267801 A1* | 8/2020 | Jung | H04W 76/11 |
| 2020/0314713 A1* | 10/2020 | Jung | H04W 4/70 |
| 2020/0344843 A1* | 10/2020 | Zhu | H04W 24/02 |
| 2020/0383030 A1* | 12/2020 | Cho | H04W 40/28 |
| 2020/0404569 A1* | 12/2020 | Cho | H04W 76/18 |
| 2020/0413457 A1* | 12/2020 | Hong | H04W 76/10 |
| 2021/0014768 A1* | 1/2021 | Hong | H04W 40/22 |
| 2021/0014893 A1* | 1/2021 | Park | H04W 36/08 |
| 2021/0075631 A1* | 3/2021 | Liao | H04W 4/24 |
| 2021/0105196 A1* | 4/2021 | Dao | H04L 43/028 |
| 2021/0105633 A1* | 4/2021 | Vaidya | H04W 76/27 |
| 2021/0119920 A1* | 4/2021 | Tesanovic | H04L 47/12 |
| 2021/0168667 A1* | 6/2021 | Byun | H04W 36/08 |
| 2021/0329565 A1* | 10/2021 | Höhne | H04W 52/226 |
| 2021/0392643 A1* | 12/2021 | Tiirola | H04W 72/0453 |
| 2021/0400552 A1* | 12/2021 | Shih | H04W 76/11 |
| 2022/0070959 A1* | 3/2022 | Jung | H04W 76/19 |
| 2022/0095156 A1* | 3/2022 | Johansson | H04W 28/0289 |
| 2022/0124543 A1* | 4/2022 | Orhan | G06N 3/088 |
| 2022/0132362 A1* | 4/2022 | Xiao | H04W 28/0273 |
| 2022/0225058 A1* | 7/2022 | Xiong | H04W 8/18 |
| 2022/0248296 A1* | 8/2022 | Merwaday | H04W 36/30 |
| 2022/0248495 A1* | 8/2022 | Mildh | H04W 76/22 |
| 2022/0264447 A1* | 8/2022 | Byun | H04W 52/0235 |
| 2022/0272648 A1* | 8/2022 | Korhonen | H04W 56/0025 |
| 2022/0272723 A1* | 8/2022 | Cho | H04W 72/23 |
| 2022/0279511 A1* | 9/2022 | Kowalski | H04W 72/20 |
| 2022/0312530 A1* | 9/2022 | Turtinen | H04W 76/11 |
| 2022/0322291 A1* | 10/2022 | Wang | H04W 76/10 |
| 2023/0040285 A1* | 2/2023 | Parichehrehteroujeni | H04W 36/0079 |

\* cited by examiner

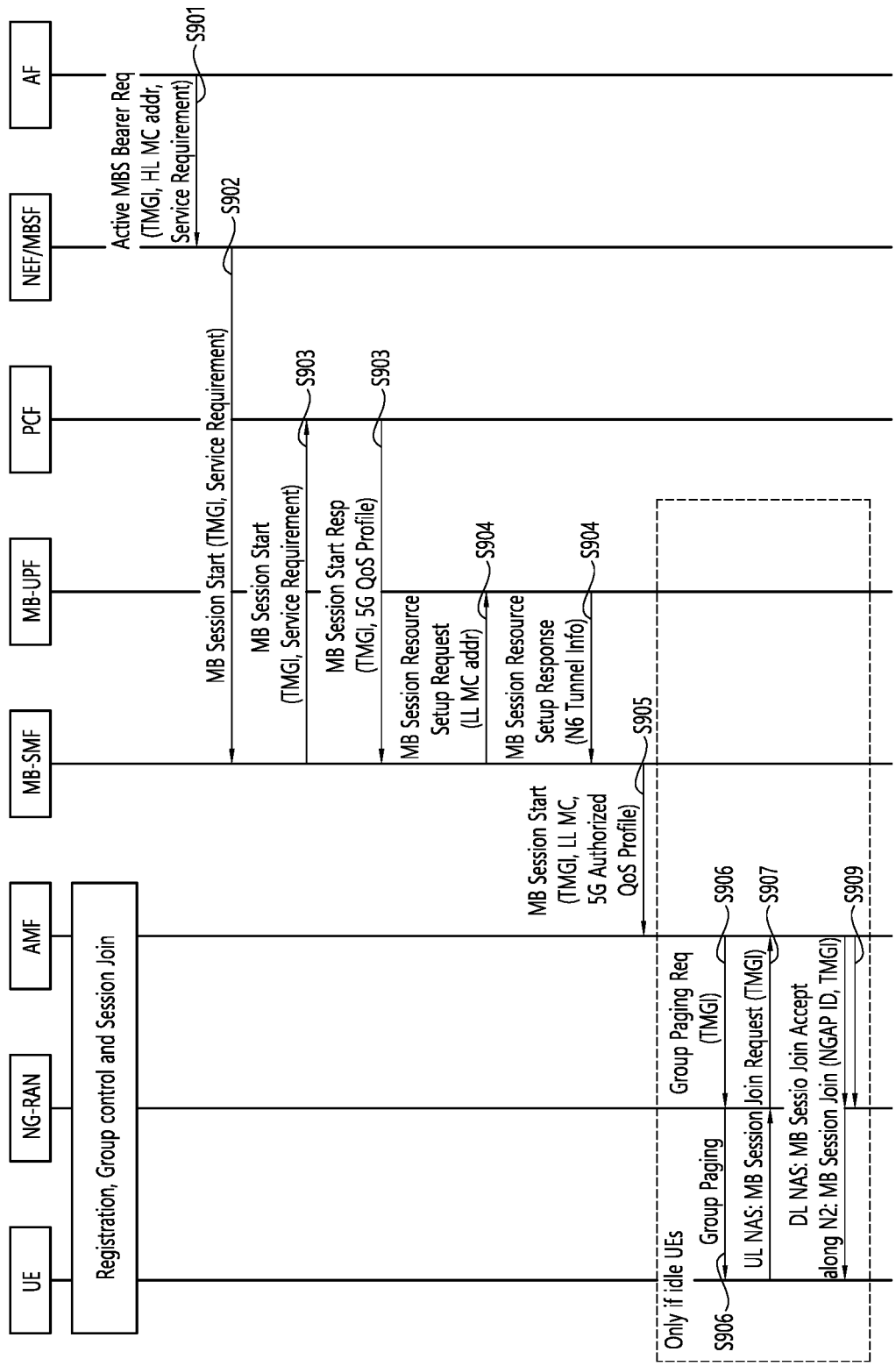

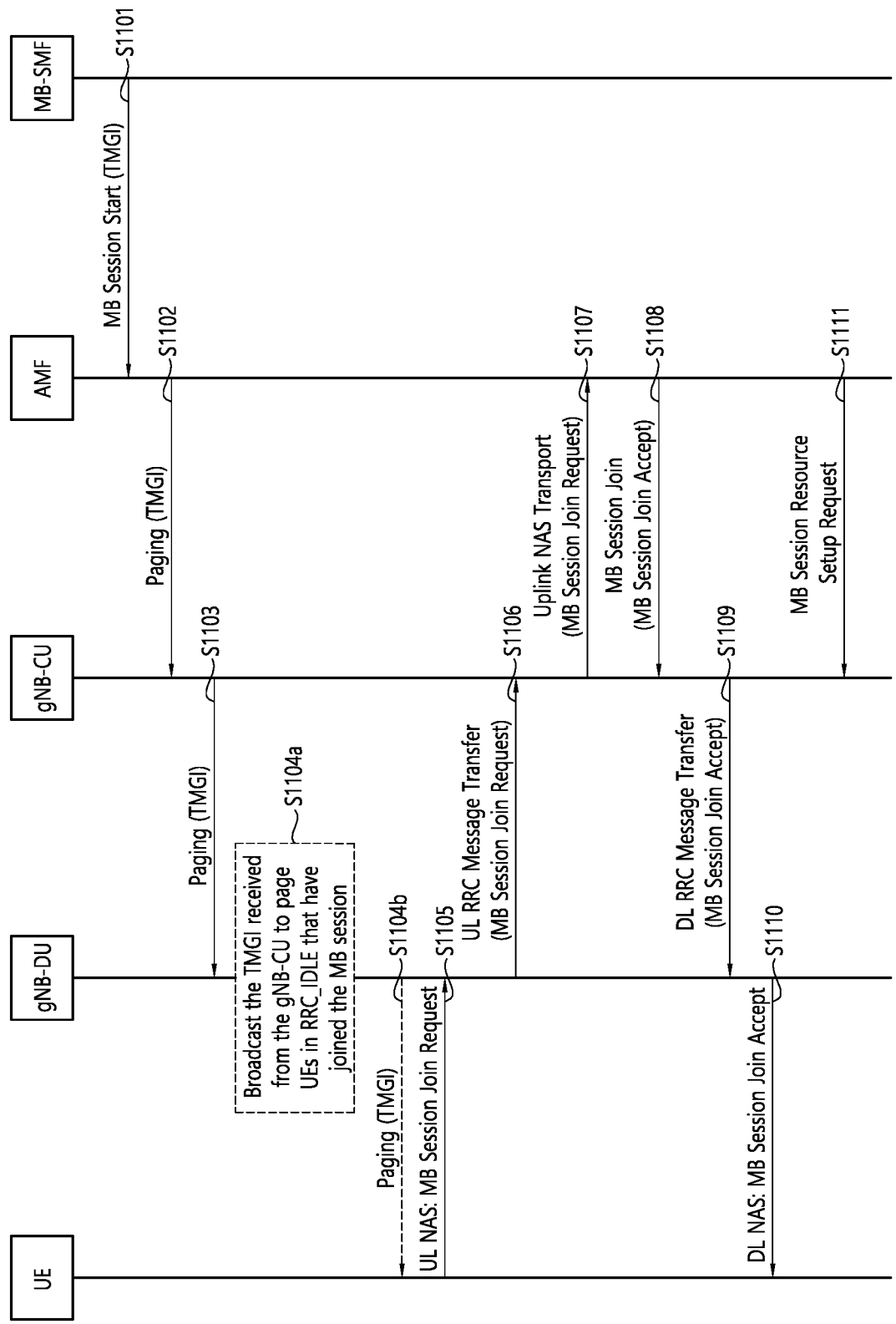

METHOD AND APPARATUS FOR PAGING FOR MULTICAST AND BROADCAST SERVICE IN A WIRELESS COMMUNICATION SYSTEM

CROSS-REFERENCE TO RELATED APPLICATION

Pursuant to 35 U.S.C. § 119 (a), this application claims the benefit of an earlier filing date and right of priority to Korean Patent Application No. 10-2020-0083600 filed on Jul. 7, 2020, the contents of which is hereby incorporated by reference herein in its entirety.

BACKGROUND

Technical Field

The present disclosure relates to a method and apparatus for paging for multicast and broadcast service in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NR, Multicast and/or Broadcast Services (MBS) may support multicast and/or broadcast services in 5G architecture.

For example, RAN basic functions for broadcast/multicast may be supported for UEs in RRC_CONNECTED state. For example, a group scheduling mechanism may be supported to allow UEs to receive Broadcast/Multicast service. In addition, the group scheduling mechanism may be supported to enable simultaneous operation with unicast reception. For example, dynamic change of Broadcast/Multicast service delivery between multicast (for example, Point to Multipoint (PTM)) and unicast (for example, Point to Point (PTP)) may be supported for service continuity for a given UE. For example, basic mobility may be supported for service continuity. For example, dynamic control of the Broadcast/Multicast transmission area within one Distributed Unit (DU) of a RAN node (for example, a gNodeB (gNB)) may be supported.

SUMMARY

A RAN node (for example, a gNB) may be composed of a Central Unit (CU) and a Distributed Unit (DU). For Multicast and/or Broadcast Services, one or more necessary coordination functions (for example, functions hosted by MCE) may be reside in a Central Unit (CU) of a RAN node.

A session start procedure may be performed for Multicast and/or Broadcast Services for CM-IDLE UEs that have joined a Multicast/Broadcast (MB) session. For example, the session start procedure may include a paging for CM-IDLE UEs that have joined the MB session. Since, a RAN node include a CU and a DU, the RAN node may need signalling between the CU and the DU for the paging.

Therefore, studies for paging for multicast and broadcast service in a wireless communication system are needed.

In an aspect, a method performed by a Distributed Unit (DU) of a Radio Access Network (RAN) node in a wireless communication system is provided. A DU of a RAN node may receive, from a central unit (CU) of the RAN node, a service identity for a Multicast and/or Broadcast (MB) service. A MB session may be set for the MB service. A DU of a RAN node may transmit, to multiple User Equipments (UEs) in Connection Management (CM)-IDLE state, the service identity of the MB service. The multiple UEs may have joined to the MB session. A DU of a RAN node may receive, from at least one UE among the multiple UEs, an RRC message to request the MB service. A DU of a RAN node may forward the RRC message to the CU of the RAN node.

In another aspect, an apparatus for implementing the above method is provided.

The present disclosure may have various advantageous effects.

According to some embodiments of the present disclosure, a Radio Access Network (RAN) node (for example, a base station such as an eNB or a gNB) could efficiently perform paging for Multicast and/or Broadcast Services.

For example, a DU of a RAN node could efficiently perform the paging for UEs in RRC_IDLE that have joined the MB session, based on the service identity (for example, Temporary Mobile Group Identity (TMGI)).

For example, a CU of a RAN node could efficiently support the paging for UEs joined the MB session, by providing the service identity to the DU of the RAN node.

For example, a RAN node could perform the group paging efficient through state transition of UEs in RRC_IDLE only involving the service indicated by a core network (CN).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIGS. 9A and 9B show an example of a method for session start procedure to which implementations of the present disclosure is applied.

FIG. 11 shows an example of a method for paging for multicast and broadcast service in a wireless communication system, according to some embodiments of the present disclosure.

DESCRIPTION OF EXEMPLARY EMBODIMENTS

Figure 1:
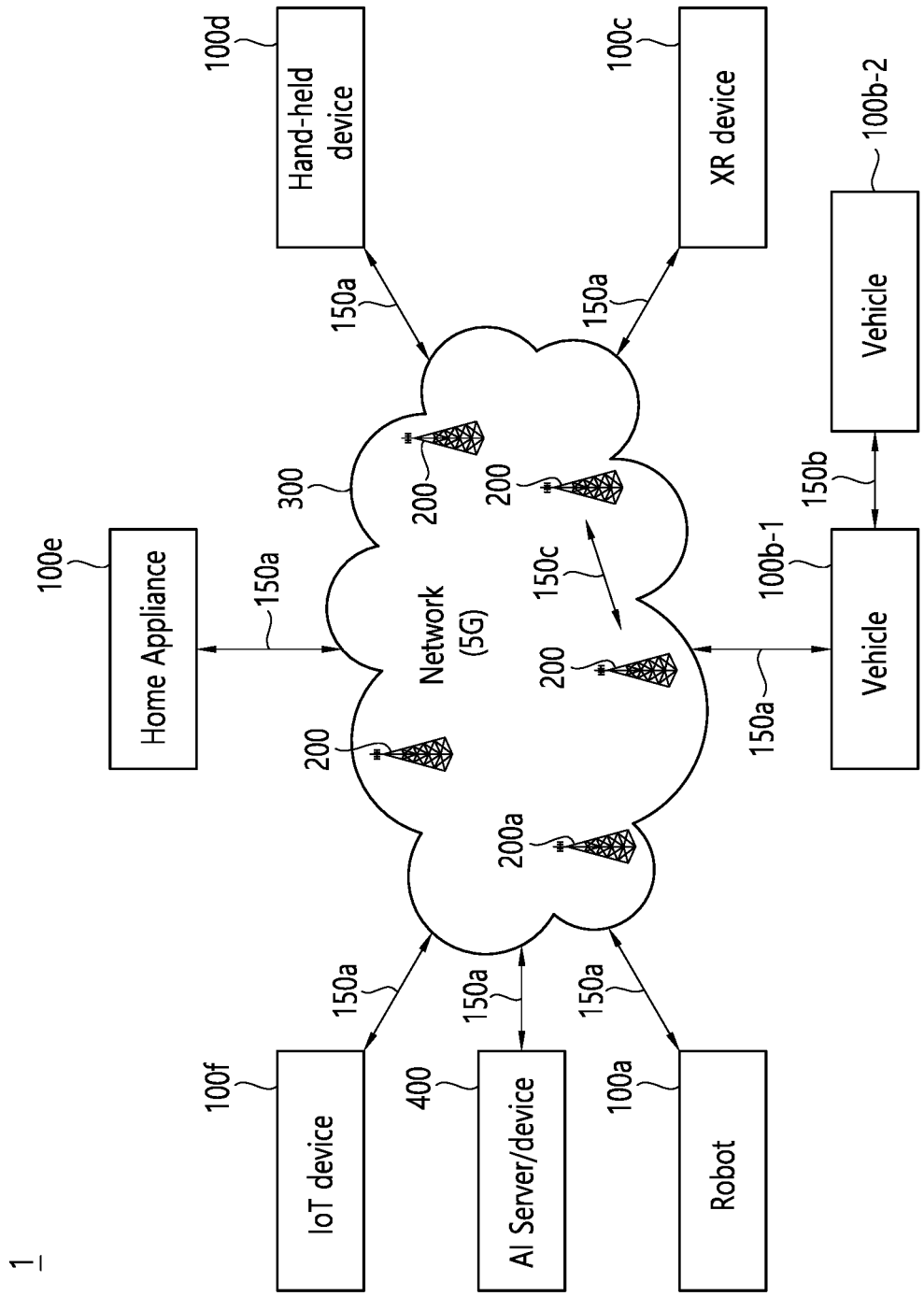
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally, and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
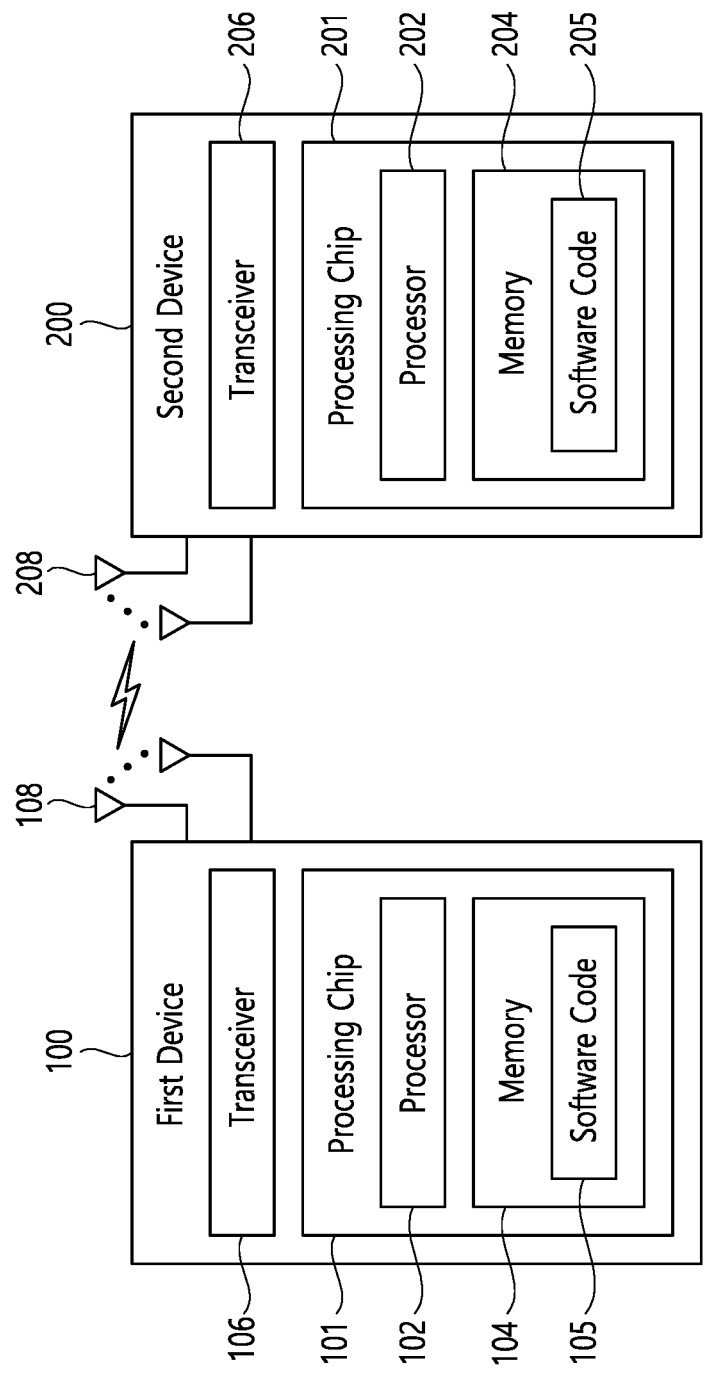
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
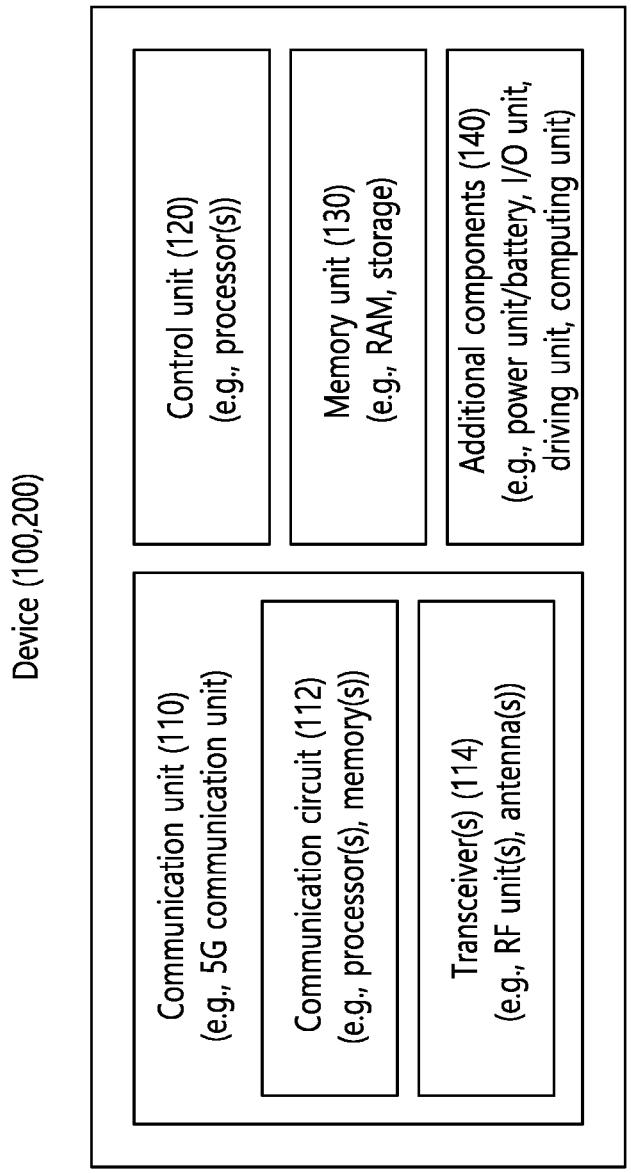
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
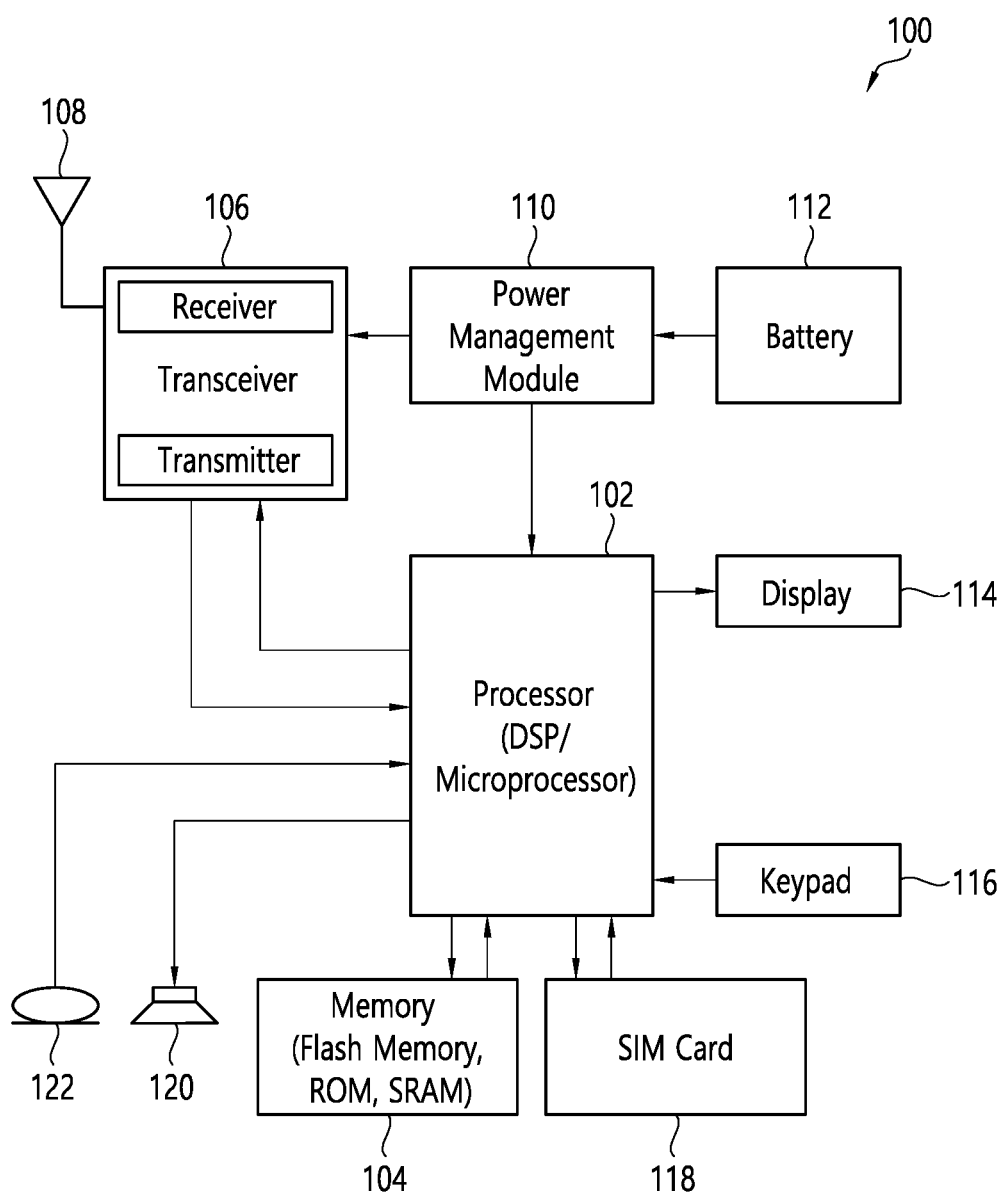
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
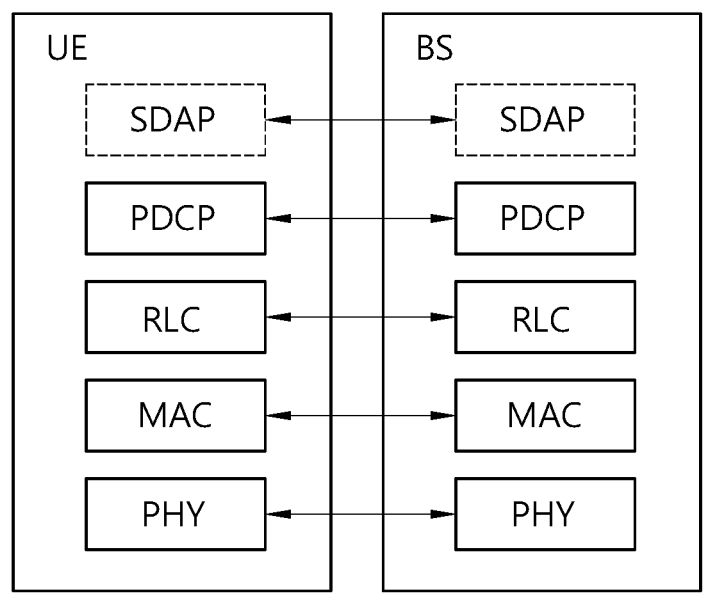
FIGS. 5 and 6 show an example of protocol stacks in a 3GPP based wireless communication system to which implementations of the present disclosure is applied.
Figure 6:
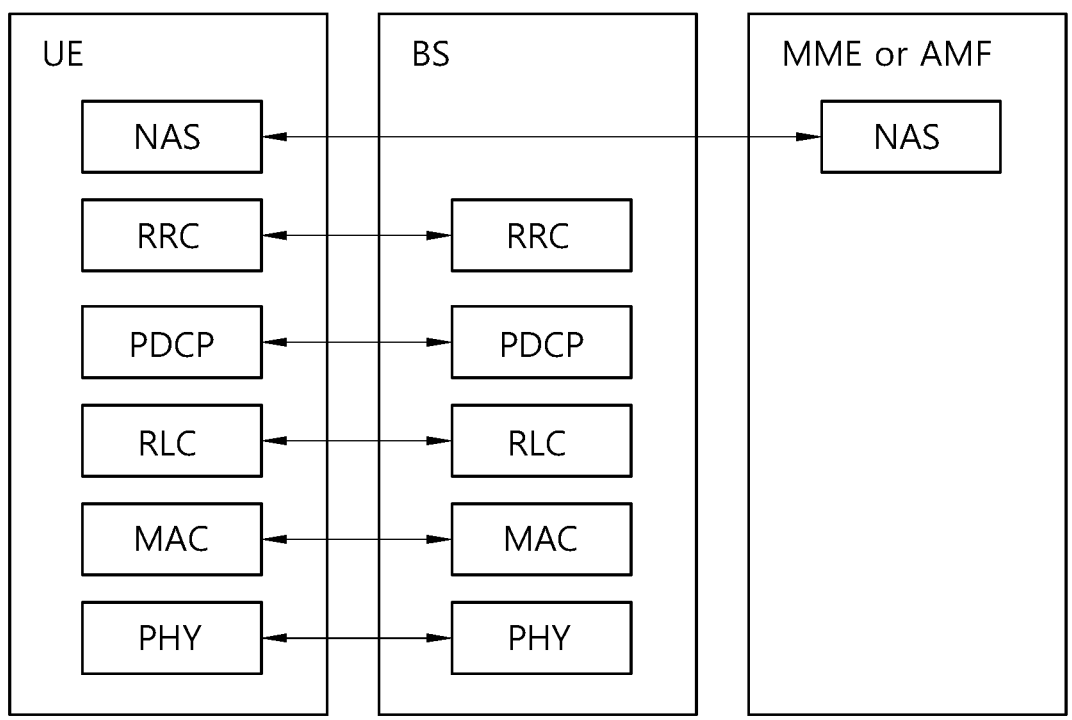

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
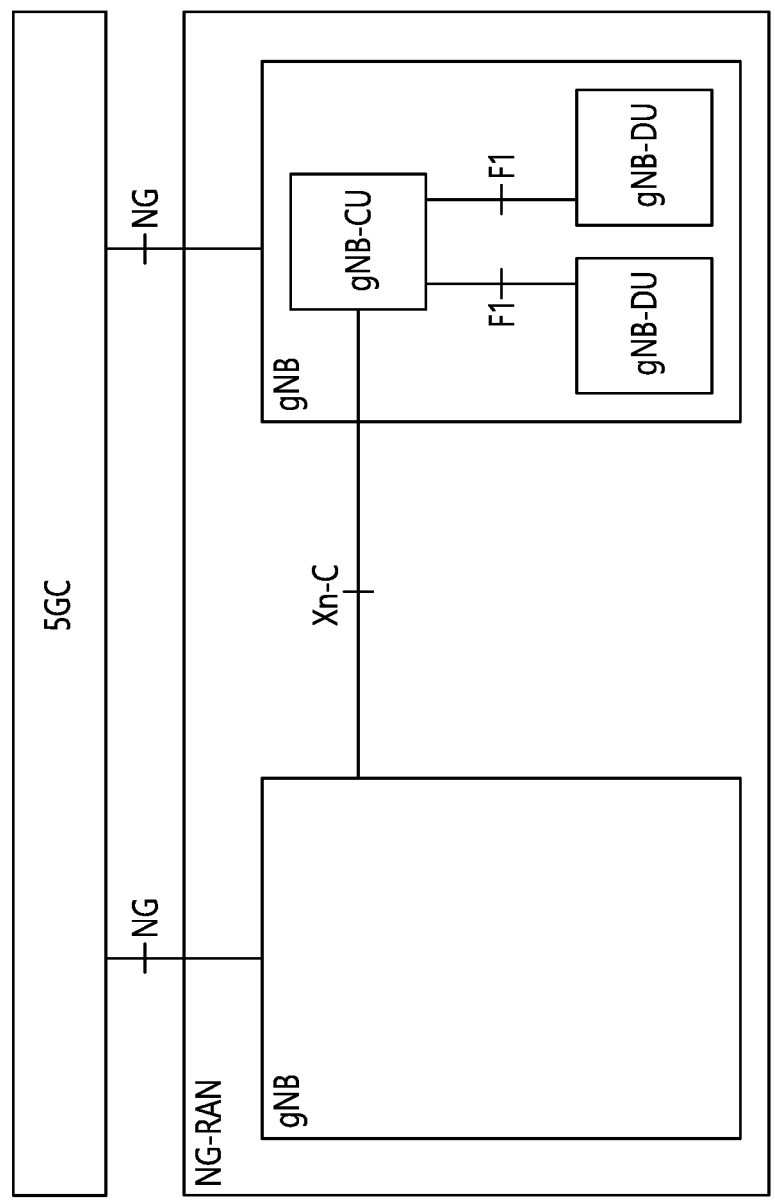
FIG. 7 shows an example of the overall architecture of an NG-RAN to which technical features of the present disclosure can be applied.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
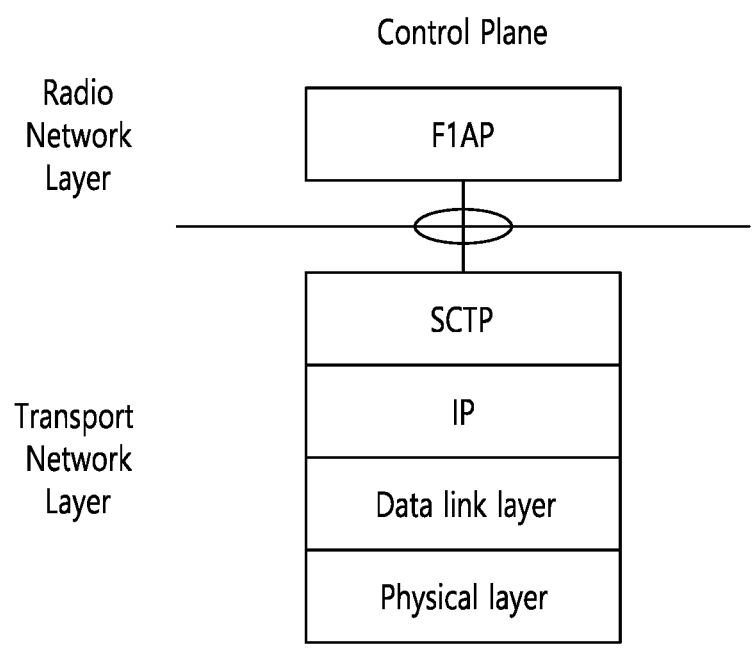
FIG. 8 shows an interface protocol structure for F1-C to which technical features of the present disclosure can be applied.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

Hereinafter, 5GS Connection Management states are described. Section 5.3.3.2 of 3GPP TS 23.501 V16.4.0 may be referred.

Two CM states are used to reflect the NAS signalling Connection of the UE with the AMF: (1) CM-IDLE, and (2) CM-CONNECTED.

The CM state for 3GPP access and Non-3GPP access are independent of each other, i.e. one can be in CM-IDLE state at the same time when the other is in CM-CONNECTED state.

A UE in CM-IDLE state has no NAS signalling connection established with the AMF over N1. The UE performs cell selection/cell reselection and PLMN selection.

There are no AN signalling connection, N2 connection and N3 connections for the UE in the CM-IDLE state.

The UE provides 5G-S-TMSI as part of AN parameters during AN signalling connection establishment. The UE shall enter CM-CONNECTED state whenever an AN signalling connection is established between the UE and the AN (entering RRC Connected state over 3GPP access, or at the establishment of the UE-N3IWF connectivity over untrusted non-3GPP access or the UE-TNGF connectivity over trusted non-3GPP access). The transmission of an Initial NAS message (Registration Request, Service Request or Deregistration Request) initiates the transition from CM-IDLE to CM-CONNECTED state.

The AMF shall enter CM-CONNECTED state for the UE whenever an N2 connection is established for this UE between the AN and the AMF. The reception of initial N2 message (e.g., N2 INITIAL UE MESSAGE) initiates the transition of AMF from CM-IDLE to CM-CONNECTED state.

The UE and the AMF may optimize the power efficiency and signalling efficiency of the UE when in CM-IDLE state e.g. by activating MICO mode A UE in CM-CONNECTED state has a NAS signalling connection with the AMF over N1. A NAS signalling connection uses an RRC Connection between the UE and the NG-RAN and an NGAP UE association between the AN and the AMF for 3GPP access. A UE can be in CM-CONNECTED state with an NGAP UE association that is not bound to any TNLA between the AN and the AMF. Upon completion of a NAS signalling procedure, the AMF may decide to release the NAS signalling connection with the UE.

The AMF may keep a UE CM state in the AMF in CM-CONNECTED state until the UE de-registers from the core network.

A UE in CM-CONNECTED state can be in RRC Inactive state. When the UE is in RRC Inactive state the following applies:
  UE reachability is managed by the RAN, with assistance information from core network;
  UE paging is managed by the RAN.
  UE monitors for paging with UE's CN (5G S-TMSI) and RAN identifier.

Hereinafter, paging procedure is described. Section 8.7.1 of 3GPP TS 38.473 V16.1.0 may be referred.

The purpose of the Paging procedure is used to provide the paging information to enable the gNB-DU to page a UE. The procedure uses non-UE associated signalling.

The gNB-CU initiates the procedure by sending a PAGING message.

The Paging DRXIE may be included in the PAGING message, and if present the gNB-DU may use it to determine the final paging cycle for the UE.

At the reception of the PAGING message, the gNB-DU shall perform paging of the UE in cells which belong to cells as indicated in the Paging Cell List IE.

The Paging Origin IE may be included in the PAGING message, and if present the gNB-DU shall transfer it to the UE.

Figure 9B:
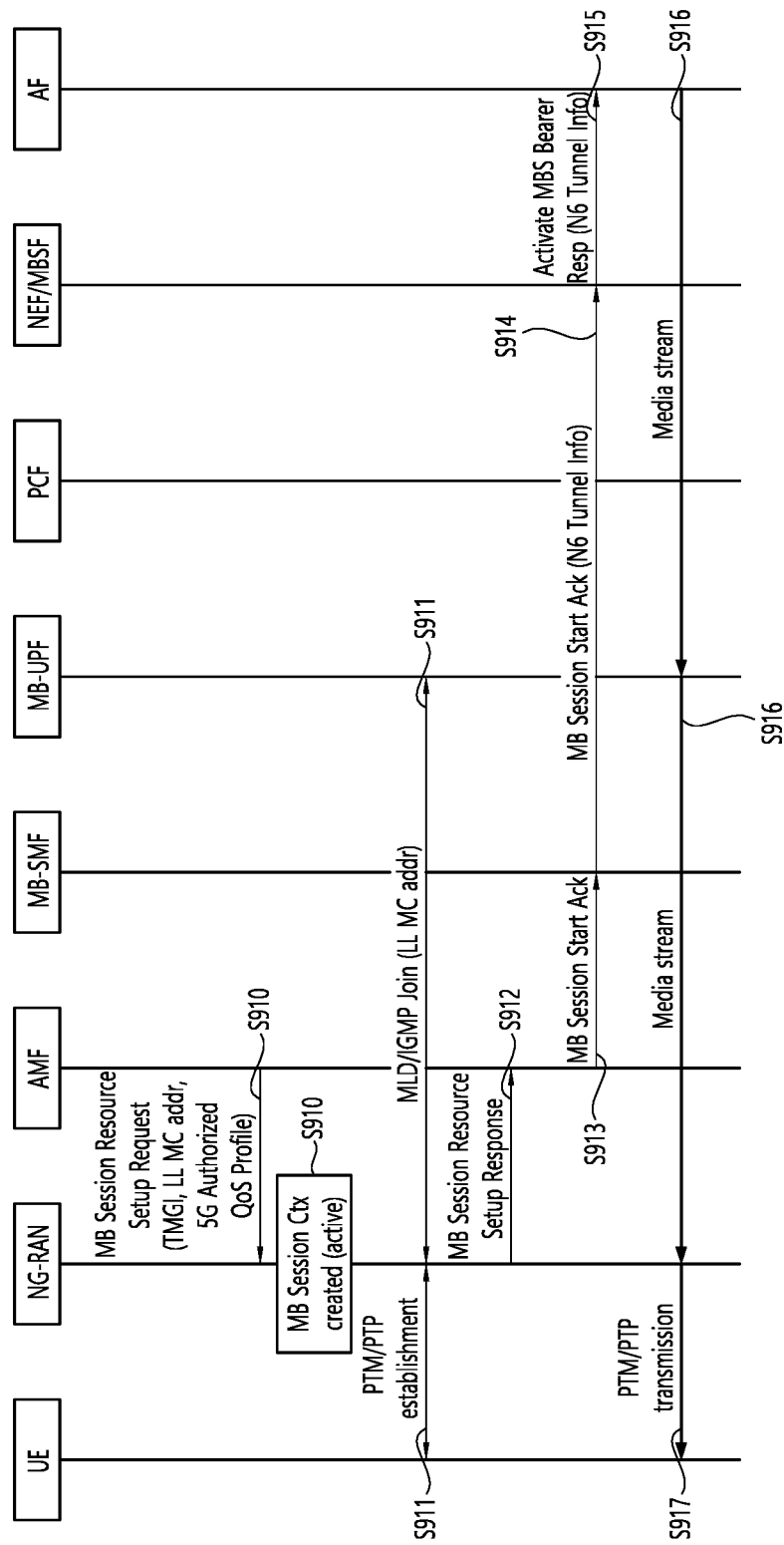

FIGS. 9A and 9B show an example of a method for session start procedure to which implementations of the present disclosure is applied.

In step S900, a UE may perform Registration, Group Control and Session Join procedure with an NG-RAN and an Access and Mobility Management Function (AMF).

In step S901, an Application Function (AF) may transmit an Active MBS Bearer Request to a Network Exposure Function (NEF) and/or an MBS control function (MBSF). For example, the AF may request activation of an MB Session by sending an Activate MBS Bearer Request message to the NEF. For example, the Active MBS Bearer Request may include a Temporary Mobile Group Identity (TMGI), a Higher Layer IP Multicast Address (HL MC Address), and/or Service Requirement. AF may have allocated the HL MC address. Service Requirement for the MB Session may be included.

In step S902, the NEF may check if the input parameters (for example, a HL MC address) are valid. The NEF may set the MB Session CTx to active. NEF may send a MB Session Start message to the MB-SMF. For example, the MB Session Start message may include TMGI and/or Service Requirement.

In step S903, MB-Session Management Function (MB-SMF) may send the TMGI for the MB Session and the Service Requirement to the Policy Control function (PCF). The PCF may return a 5G (Quality of Service) QoS Profile, which the MB-SMF uses as the 5G Authorized QoS Profile for the MB Session.

In step S904, MB-SMF may set up the resources in the MB-User Plane Function (MB-UPF) with a Packet Detection Rule for the Lower Layer IP Multicast Address (LL MC address) allocated for the TMGI and stored in the MB Session Core network and Terminals (MB Session CTx). Optionally Media reception in MB-UPF may be untunnelled, in which case the MB-SMF also provides the HL MC address so that the MB-UPF can join and receive the Media stream.

For example, the MB-UPF may allocate N6 tunnel information (for example, UDP port and IP address) and return to the MB-SMF. Optionally if N6 tunnel is not used, the MB-UPF may instead join the HL MC address to receive the Media stream. MB-SMF may store the received info in the MB Session CTx.

In step S905, MB-SMF may set the MB Session CTx to active and send MB Session Start messages to all AMFs that has earlier joined the MB Session. For example, the MB Session Start message may include TMGI, LL MC address, and/or 5G Authorized QoS Profile.

When the AMF receives the MB Session Start message, AMF may set its MB Session CTx to active state. The AMF may proceed with step S906 and step S910 onwards in parallel.

In step S906, if the AMF has CM-IDLE UEs that have joined the MB Session, the AMF may perform group paging including the Group Paging Identity (for example, TMGI) in the Paging message in the registration areas of the CM-IDLE UEs. The NG-RAN node may trigger group paging.

In steps S907 and S909, UEs may respond to the Group paging, for example, by sending UL NAS MB Session Join Request (TMGI) to AMF.

In step S910, the AMF may send a MB Session Resource Setup Request message to all RAN nodes where CM CONNECTED UEs that has joined the TMGI resides. For example, the MB Session Resource Setup Request message may include TMGI, LL MC address and/or 5G Authorized QoS Profile. NG-RAN may create a MB Session CTx (if it not already exists), set it to 'active' state, store the TMGI, the QoS Profile and a list of AMF IDs in the MB Session CTx. If a NG RAN node receives multiple MB Session Resource Setup Request messages for the same TMGI (for example, from several AMFs the NG-RAN is connected to), NG-RAN may store each sender AMF ID in the MB Session CTx, but only performs step S911 once (instead continues at step S912).

In step S911, the NG-RAN may join the multicast group (for example, LL MC address) and establish PTM or PTP DL resources for the MB Session. If there are UEs in CM-Connected with RRC INACTIVE state with the TMGI in their UE Contexts, NG-RAN may perform the Network triggered transition from RRC INACTIVE to RRC_CONNECTED procedure for those UEs.

In step S912, the NG-RAN may report successful establishment of the MB Session resources by sending MB Session Resource Setup Response message(s) to the AMF. For example, the MB Session Resource Setup Response message(s) may include TMGI.

In step S913, the AMF may send MB Session Start Acknowledgement (ACK) to the MB-SMF. For example, the MB Session Start ACK may include TMGI.

In steps S914 and S915, the MB-SMF may send the MB Session Start ACK message to the NEF. For example, the MB Session Start ACK message may include TMGI. N6

Tunnel info may be included in the response if not already provided to the AF. The NEF may send an Activate MBS Bearer Response including the N6 Tunnel Info to the AF.

In step S916, the MB Session may be now active. The AF may start transmitting the DL media stream using the N6 Tunnel Info, or optionally untunneled, for example, as an IP multicast stream using the HL MC address.

In step S917, the NG-RAN may transmit the received DL media stream using DL PTM or PTP resources.

Meanwhile, a RAN node (for example, a gNB) may be composed of a Central Unit (CU) and a Distributed Unit (DU). For Multicast and/or Broadcast Services, one or more necessary coordination functions (for example, functions hosted by MCE) may be reside in a Central Unit (CU) of a RAN node.

A session start procedure may be performed for Multicast and/or Broadcast Services for CM-IDLE UEs that have joined a Multicast/Broadcast (MB) session. For example, the session start procedure may include a paging for CM-IDLE UEs that have joined the MB session. Since, a RAN node include a CU and a DU, the RAN node may need signalling between the CU and the DU for the paging.

Therefore, studies for paging for multicast and broadcast service in a wireless communication system are needed.

Hereinafter, a method for paging for multicast and broadcast service in a wireless communication system, according to some embodiments of the present disclosure, will be described.

Figure 10:
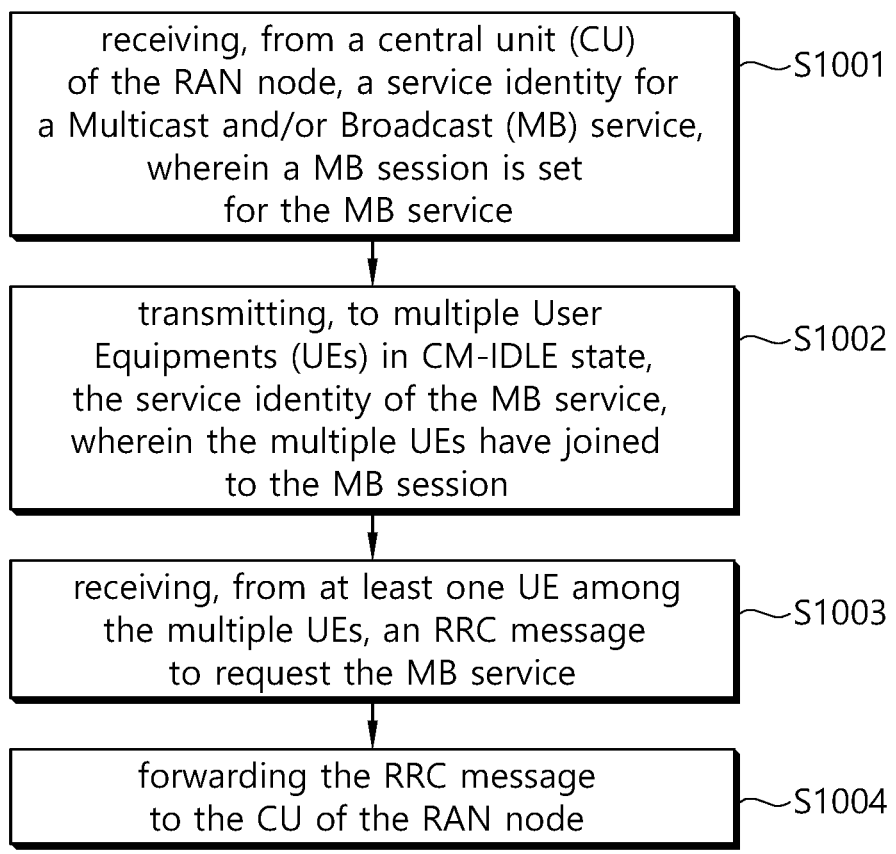
FIG. 10 shows an example of a method for paging for multicast and broadcast service in a wireless communication system, according to some embodiments of the present disclosure.

FIG. 10 shows an example of a method for paging for multicast and broadcast service in a wireless communication system, according to some embodiments of the present disclosure.

In particular, FIG. 10 illustrates a method performed by a Distributed Unit (DU) of a Radio Access Network (RAN) node in a wireless communication system.

In step S1001, the DU of the RAN node may receive, from a central unit (CU) of the RAN node, a service identity for a Multicast and/or Broadcast (MB) service. The MB session may be set for the MB service.

For example, the service identity may include a Session ID of the MB Service and/or a service ID of the MB service.

For example, the service identity may include a Temporary Mobile Group Identity (TMGI) for the MB service.

For example, an MB-Session Management Function (MB-SMF) may set the MB session context to active and send an MB Session Start message including the TMGI to the Access and Mobile management Function (AMF) that has earlier joined the MB session. If the AMF has CM-IDLE UEs that have joined the MB session, the AMF may perform group paging including the TMGI in the Paging message in the registration areas of the CM-IDLE UEs. Upon the receipt of the Paging message, the gNB-CU may send the Paging message containing the received TMGI to the gNB-DU to page multiple UEs in CM IDLE that have joined the MB session. The TMGI may be included into the CN UE Paging Identity IE in the Paging message because this paging is triggered by the AMF. For example, the multiple UEs in CM_IDLE may be in RRC-IDLE state.

In step S1002, the DU of the RAN node may transmit, to multiple User Equipments (UEs) in CM-IDLE state, the service identity of the MB service. The multiple UEs may have joined to the MB session.

For example, the multiple UEs may be in Radio Resource Control (RRC)-IDLE state.

For example, the DU of the RAN node may transmit, to the multiple UEs, the service identity of the MB service by broadcasting the service identity to the multiple UEs. Then, the DU of the RAN node may page the multiple UEs based on the broadcasted service identity.

For other example, the DU of the RAN node may transmit, to the multiple UEs, the service identity of the MB service by transmitting, to the multiple UEs, a paging message including the service identity.

In step S1003, the DU of the RAN node may receive, from at least one UE among the multiple UEs, an RRC message to request the MB service.

For example, the RRC message may include an authentication to join the MB session.

For example, at least one UE among the multiple UEs may send the RRC message containing the MB Session Join Request message, which is the NAS message, to the gNB-DU.

In step S1004, the DU of the RAN node may forward the RRC message to the CU of the RAN node.

For example, the CU of the RAN node mat forward the received RRC message to the AMF. The DU of the RAN node may receive, from the AMF, an MB Session Join Accept message via the CU of the RAN node.

For example, the DU of the RAN node may transmit, to the multiple UEs in CM-IDLE state, the MB Session Join Confirm message. For example, the MB Session Join Confirm message may be a Non-Access Stratum (NAS) message.

According to some embodiments of the present disclosure, in steps S1003 and S1004, the gNB-DU may forward the received RRC message including the NAS message to the gNB-CU. The gNB-CU may forward the NAS message included into the RRC message to the AMF. On receiving the NAS message, the AMF may transmit the MB Session Join message containing the MB Session Join Accept message, which is the NAS message, to the gNB-CU. The gNB-CU may forward the received NAS message using the RRC message to the gNB-DU. The gNB-DU may forward the RRC message including the NAS message to the UE. Then, the AMF may send the MB Session Resource Setup Request message to the gNB-CU in order for the gNB-CU to create a MB session context and set it to active state.

According to some embodiments of the present disclosure, at least one UE among the multiple UEs may be in communication with at least one of a user equipment, a network, or an autonomous vehicle other than the at least one UE.

FIG. 11 shows an example of a method for paging for multicast and broadcast service in a wireless communication system, according to some embodiments of the present disclosure.

In particular, FIG. 11 illustrates an example of a session start procedure including a method for paging for multicast and broadcast service, according to some embodiments of the present disclosure.

In FIG. 11, a gNB-CU may provide a gNB-DU with the service identity (for example, TMGI) so that the gNB-DU can perform the paging for UEs in RRC_IDLE that have joined the MB session (for example, any CM-IDLE UE with the specific TMGI of a MB session). Based on the received service identity, the gNB-DU may broadcast the received service identity or send the RRC message with the received service identity. Thus, the gNB-DU could transmit the paging information efficiently.

In step S1101, the MB-SMF may set the MB session context to active. The MB-SMF may send the MB Session Start message including the TMGI to the AMF that has earlier joined the MB session.

In step S1102, if the AMF has CM-IDLE UEs that have joined the MB session, the AMF may perform group paging including the TMGI in the Paging message in the registration areas of the CM-IDLE UEs.

In step S1103, upon the receipt of the Paging message, the gNB-CU may send the Paging message containing the received TMGI to the gNB-DU to page UEs in RRC_IDLE that have joined the MB session. This TMGI may be included into the CN UE Paging Identity IE in the Paging message because this paging is triggered by the AMF.

According to whether to provide the received TMGI to UEs in RRC_IDLE that have joined the MB session so that the gNB-DU performs the group paging, there are two options as below.

In step S1104a, on receiving the message from the gNB-CU, the gNB-DU may broadcast the received TMGI to page UEs in RRC_IDLE that have joined the MB session.

In step S1104b, upon the receipt of the message from the gNB-CU, the gNB-DU may transmit the Paging or new message including the received TMGI to page UEs in RRC_IDLE that have joined the MB session.

In step S1105, the UE may send the RRC message containing the MB Session Join Request message, which is the NAS message, to the gNB-DU. For example, the MB session Join Request message may be an acknowledgement for the paging or the new message received from step S1104b.

In step S1106, the gNB-DU may forward the received RRC message including the NAS message to the gNB-CU.

In step S1107, the gNB-CU may forward the NAS message included into the RRC message to the AMF.

In step S1108, on receiving the NAS message, the AMF may transmit the MB Session Join message containing the MB Session Join Accept message, which is the NAS message, to the gNB-CU.

In step S1109, the gNB-CU may forward the received NAS message using the RRC message to the gNB-DU.

In step S1110, the gNB-DU may forward the RRC message including the NAS message to the UE.

In step S1111, the AMF may send the MB Session Resource Setup Request message to the gNB-CU in order for the gNB-CU to create a MB session context and set it to active state.

Hereinafter, an apparatus for paging for multicast and broadcast service in a wireless communication system, according to some embodiments of the present disclosure, will be described.

For example, referring to FIG. 7, a gNB-CU and a gNB-DU could be an example of the CU of a RAN node and the DU of a RAN node for paging for multicast and broadcast service.

According to some embodiments of the present disclosure, a Distributed Unit (DU) of a Radio Access Network (RAN) node may include a processor, and a memory. For example, the processor may be configured to be coupled operably with the memory.

The processor may be configured to receive, from a central unit (CU) of the RAN node, a service identity for a Multicast and/or Broadcast (MB) service, wherein a MB session is set for the MB service. The processor may be configured to control the transceiver to transmit, to multiple User Equipments (UEs) in Connection Management (CM)-IDLE state, the service identity of the MB service. The multiple UEs may have joined to the MB session. The processor may be configured to control the transceiver to receive, from at least one UE among the multiple UEs, an RRC message to request the MB service. The processor may be configured to forward the RRC message to the CU of the RAN node.

For example, the processor may be configured to control the transceiver to transmit, to the multiple UEs, the service identity of the MB service by broadcasting the service identity to the multiple UEs. Then, the processor may be configured to control the transceiver to page the multiple UEs based on the broadcasted service identity.

For other example, the processor may be configured to control the transceiver to transmit, to the multiple UEs, the service identity of the MB service by transmitting, to the multiple UEs, a paging message including the service identity.

For example, the RRC message may include an authentication to join the MB session.

For example, the service identity may include a Session ID of the MB Service and/or a service ID of the MB service.

For example, the service identity may include a Temporary Mobile Group Identity (TMGI) for the MB service.

For example, the multiple UEs may be in Radio Resource Control (RRC)-IDLE state.

For example, the processor may be configured to receive, from an Access and Mobility Management Function (AMF), an MB Session Join Accept message via the CU of the RAN node. Then, the processor may be configured to control the transceiver to transmit, to the multiple UEs in CM-IDLE state, the MB Session Join Confirm message.

For example, the MB Session Join Confirm message may be a Non-Access Stratum (NAS) message.

Hereinafter, a processor for a Distributed Unit (DU) of a RAN node for paging for multicast and broadcast service in a wireless communication system, according to some embodiments of the present disclosure, will be described.

The processor may be configured to control the DU to receive, from a central unit (CU) of the RAN node, a service identity for a Multicast and/or Broadcast (MB) service, wherein a MB session is set for the MB service. The processor may be configured to control the DU to transmit, to multiple User Equipments (UEs) in Connection Management (CM)-IDLE state, the service identity of the MB service. The multiple UEs may have joined to the MB session. The processor may be configured to control the DU to receive, from at least one UE among the multiple UEs, an RRC message to request the MB service. The processor may be configured to control the DU to forward the RRC message to the CU of the RAN node.

For example, the processor may be configured to control the DU to transmit, to the multiple UEs, the service identity of the MB service by broadcasting the service identity to the multiple UEs. Then, the processor may be configured to control the DU to page the multiple UEs based on the broadcasted service identity.

For other example, the processor may be configured to control the DU to transmit, to the multiple UEs, the service identity of the MB service by transmitting, to the multiple UEs, a paging message including the service identity.

For example, the RRC message may include an authentication to join the MB session.

For example, the service identity may include a Session ID of the MB Service and/or a service ID of the MB service.

For example, the service identity may include a Temporary Mobile Group Identity (TMGI) for the MB service.

For example, the multiple UEs may be in Radio Resource Control (RRC)-IDLE state.

For example, the processor may be configured to control the DU to receive, from an Access and Mobility Management Function (AMF), an MB Session Join Accept message via the CU of the RAN node. Then, the processor may be configured to control the DU to transmit, to the multiple UEs in CM-IDLE state, the MB Session Join Confirm message.

For example, the MB Session Join Confirm message may be a Non-Access Stratum (NAS) message.

Hereinafter, a non-transitory computer-readable medium has stored thereon a plurality of instructions for paging for multicast and broadcast service in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Distributed Unit (DU) of a RAN node.

The stored a plurality of instructions may cause the DU to receive, from a central unit (CU) of the RAN node, a service identity for a Multicast and/or Broadcast (MB) service, wherein a MB session is set for the MB service. The stored a plurality of instructions may cause the DU to transmit, to multiple User Equipments (UEs) in Connection Management (CM)-IDLE state, the service identity of the MB service. The multiple UEs may have joined to the MB session. The stored a plurality of instructions may cause the DU to receive, from at least one UE among the multiple UEs, an RRC message to request the MB service. The stored a plurality of instructions may cause the DU to forward the RRC message to the CU of the RAN node.

For example, the stored a plurality of instructions may cause the DU to transmit, to the multiple UEs, the service identity of the MB service by broadcasting the service identity to the multiple UEs. Then, the stored a plurality of instructions may cause the DU to page the multiple UEs based on the broadcasted service identity.

For other example, the stored a plurality of instructions may cause the DU to transmit, to the multiple UEs, the service identity of the MB service by transmitting, to the multiple UEs, a paging message including the service identity.

For example, the RRC message may include an authentication to join the MB session.

For example, the service identity may include a Session ID of the MB Service and/or a service ID of the MB service.

For example, the service identity may include a Temporary Mobile Group Identity (TMGI) for the MB service.

For example, the multiple UEs may be in Radio Resource Control (RRC)-IDLE state.

For example, the stored a plurality of instructions may cause the DU to receive, from an Access and Mobility Management Function (AMF), an MB Session Join Accept message via the CU of the RAN node. Then, the stored a plurality of instructions may cause the DU to transmit, to the multiple UEs in CM-IDLE state, the MB Session Join Confirm message.

For example, the MB Session Join Confirm message may be a Non-Access Stratum (NAS) message.

The present disclosure may have various advantageous effects.

According to some embodiments of the present disclosure, a Radio Access Network (RAN) node (for example, a base station such as an eNB or a gNB) could efficiently perform paging for Multicast and/or Broadcast Services.

For example, a DU of a RAN node could efficiently perform the paging for UEs in RRC_IDLE that have joined the MB session, based on the service identity (for example, Temporary Mobile Group Identity (TMGI)).

For example, a CU of a RAN node could efficiently support the paging for UEs joined the MB session, by providing the service identity to the DU of the RAN node.

For example, a RAN node could perform the group paging efficient through state transition of UEs in RRC_IDLE only involving the service indicated by a core network (CN).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a Distributed Unit (DU) of a Radio Access Network (RAN) node in a wireless communication system, the method comprising:
    initiating an F1 setup procedure for a Central Unit (CU) of the RAN node;
    exchanging application level data needed for the DU and the CU to correctly interoperate on an F1 interface,
    wherein the CU is a logical node hosting radio resource control (RRC), Service Data Adaptation Protocol (SDAP), and/or Packet Data Convergence Protocol (PDCP) protocols of the RAN node that controls operations of the DU and terminates the F1 interface connected with the DU, and
    wherein the DU is a logical node hosting Radio Link Control (RLC), Medium Access Control (MAC), and physical layers of the RAN node and terminates the F1 interface connected with the CU;
    receiving, from the CU of the RAN node via the F1 interface, a message for group paging containing a core network (CN) UE Paging Identity Information Element (IE),
    wherein the message for group paging is triggered by an Access and Mobility management Function (AMF), and
    wherein the CN UE Paging Identity IE includes a Temporary Mobile Group Identity (TMGI) for a Multicast/Broadcast Service (MBS) Session;
    broadcasting the received TMGI to multiple User Equipments (UEs) in Radio Resource Control (RRC)-IDLE state that have joined the MBS session;
    receiving a first RRC message including an MBS Session Join Request message from at least one UE among the multiple UEs;
    forwarding the first RRC message including the MBS Session Join Request message to the CU of the RAN node, wherein the MBS Session Join Request message is forwarded from the CU of the RAN node to an Access and Mobility management Function (AMF);
    receiving a second RRC message including an MBS Session Join Accept message from the CU of the RAN node, wherein the MBS Session Join Accept message is forwarded from the AMF to the CU of the RAN node; and
    forwarding the second RRC message including the MBS Session Join Accept message to the at least one UE,
    wherein the MBS Session Join Request message is a Non-Access Stratum (NAS) message, and the MBS Session Join Accept message is a NAS message.

2. A Distributed Unit (DU) of a Radio Access Network (RAN) node in a wireless communication system comprising:
    a memory;
    a transceiver; and
    at least one processor operatively coupled to the memory and the transceiver, and configured to:
    initiate an F1 setup procedure for a Central Unit (CU) of the RAN node;
    exchange application level data needed for the DU and the CU to correctly interoperate on an F1 interface,
    wherein the CU is a logical node hosting radio resource control (RRC), Service Data Adaptation Protocol (SDAP), and/or Packet Data Convergence Protocol (PDCP) protocols of the RAN node that controls operations of the DU and terminates the F1 interface connected with the DU, and
    wherein the DU is a logical node hosting Radio Link Control (RLC), Medium Access Control (MAC), and physical layers of the RAN node and terminates the F1 interface connected with the CU;
    receive, from the CU of the RAN node via the F1 interface, a message for group paging containing a core network (CN) UE Paging Identity Information Element (IE),
    wherein the message for group paging is triggered by an Access and Mobility management Function (AMF), and
    wherein the CN UE Paging Identity IE includes a Temporary Mobile Group Identity (TMGI) for a Multicast/Broadcast Service (MBS) Session;
    broadcasting the received TMGI to multiple User Equipments (UEs) in Radio Resource Control (RRC)-IDLE state that have joined the MBS session;
    receiving a first RRC message including an MBS Session Join Request message from at least one UE among the multiple UEs;
    forwarding the first RRC message including the MBS Session Join Request message to the CU of the RAN node, wherein the MBS Session Join Request message is forwarded from the CU of the RAN node to an Access and Mobility management Function (AMF);
    receiving a second RRC message including an MBS Session Join Accept message from the CU of the RAN node, wherein the MBS Session Join Accept message is forwarded from the AMF to the CU of the RAN node; and
    forwarding the second RRC message including the MBS Session Join Accept message to the at least one UE,
    wherein the MBS Session Join Request message is a Non-Access Stratum (NAS) message, and the MBS Session Join Accept message is a NAS message.

* * * * *